United States Patent
Wonisch et al.

(10) Patent No.: US 12,251,860 B2
(45) Date of Patent: Mar. 18, 2025

(54) METHOD FOR FUSING PARTICLE FOAMS BY MEANS OF POROUS SLEEVES

(71) Applicant: BASF SE, Ludwigshafen am Rhein (DE)

(72) Inventors: Andreas Wonisch, Ludwigshafen am Rhein (DE); Peter Gutmann, Ludwigshafen am Rhein (DE); Andreas Wuest, Ludwigshafen am Rhein (DE); Frank Prissok, Lemfoerde (DE); Juergen Ahlers, Gross-Rohrheim (DE)

(73) Assignee: BASF SE, Ludwigshafen am Rhein (DE)

( * ) Notice: Subject to any disclaimer, the term of this patent is extended or adjusted under 35 U.S.C. 154(b) by 203 days.

(21) Appl. No.: 17/757,380

(22) PCT Filed: Dec. 17, 2020

(86) PCT No.: PCT/EP2020/086695
§ 371 (c)(1),
(2) Date: Jun. 15, 2022

(87) PCT Pub. No.: WO2021/122937
PCT Pub. Date: Jun. 24, 2021

(65) Prior Publication Data
US 2023/0023694 A1 Jan. 26, 2023

(30) Foreign Application Priority Data
Dec. 17, 2019 (EP) ..................... 19216978

(51) Int. Cl.
| | | |
|---|---|---|
| *B29C 44/44* | (2006.01) | |
| *B29C 44/18* | (2006.01) | |
| *B29C 44/34* | (2006.01) | |
| *B29C 44/60* | (2006.01) | |
| *C08J 9/232* | (2006.01) | |
| *B29K 101/12* | (2006.01) | |
| *B29K 105/04* | (2006.01) | |

(52) U.S. Cl.
CPC .......... *B29C 44/445* (2013.01); *B29C 44/182* (2013.01); *B29C 44/3426* (2013.01); *B29C 44/60* (2013.01); *C08J 9/232* (2013.01); *B29K 2101/12* (2013.01); *B29K 2105/048* (2013.01); *C08J 2207/02* (2013.01); *C08J 2367/00* (2013.01); *C08J 2375/04* (2013.01)

(58) Field of Classification Search
None
See application file for complete search history.

(56) References Cited

U.S. PATENT DOCUMENTS

| | | |
|---|---|---|
| 2008/0275148 A1 | 11/2008 | Tokiwa et al. |
| 2015/0360401 A1 | 12/2015 | Gomibuchi et al. |

FOREIGN PATENT DOCUMENTS

| | | | |
|---|---|---|---|
| DE | 10036185 | 1/2001 | |
| EP | 0664313 A1 * | 10/1995 | ............... C08J 9/34 |
| FR | 1353225 A | 2/1964 | |
| GB | 886535 A | 1/1962 | |
| GB | 1227542 A | 4/1971 | |

OTHER PUBLICATIONS

EP 0664313 Machine translation(Year: 1995).*
International Search Report dated Feb. 4, 2021, in PCT/EP2020/086695, with English translation, 5 pages.
International Preliminary Report on Patentability dated Nov. 22, 2021, in PCT/EP2020/086695, with English translation, 12 pages.
Written Opinion dated Feb. 4, 2021, in PCT/EP2020/086695, with English translation, 9 pages.

* cited by examiner

*Primary Examiner* — Robert J Grun
(74) *Attorney, Agent, or Firm* — Grüneberg and Myers PLLC

(57) ABSTRACT

A process for producing a molded article involves providing a thin-walled, gas-permeable shell; filling the shell with a foamed pelletized material composed of a polymer; and welding the foamed pelletized material to obtain the molded article. Molded articles are obtainable or obtained by such a process, and can be used as a footwear sole, part of a footwear sole, a mattress, a seat cushion, an underlay, a grip, a protective film, a component in automobile interiors and exteriors, a gymnastics mat, a body protector, a trim element in automobile construction, a sound insulator, a vibration damper, a cushion, a bicycle saddle, a toy, a tire or part of a tire, a covering for a track and field surface, a covering for a sports hall or a pathway, a damping layer or a damping core in a sandwich element, or a packaging.

20 Claims, No Drawings

METHOD FOR FUSING PARTICLE FOAMS BY MEANS OF POROUS SLEEVES

CROSS-REFERENCE TO RELATED APPLICATIONS

This application is the National Stage entry under § 371 of International Application No. PCT/EP2020/086695, filed on Dec. 17, 2020, and which claims the benefit of priority to European Application No. 19216978.7, filed on Dec. 17, 2019. The content of each of these applications is hereby incorporated by reference in its entirety.

BACKGROUND OF THE INVENTION

Field of the Invention

The present invention relates to a process for producing a molded article (M), comprising the providing of a thin-walled, gas-permeable shell; the filling of the shell with a foamed pelletized material composed of a polymer (P1), and the welding of the foamed pelletized material to obtain the molded article (M). In addition, the present invention also relates to molded articles obtainable or obtained by such a process, and to the use of a molded article obtainable or obtained by a process of the invention as footwear sole, part of a footwear sole, mattress, seat cushion, underlay, grip, protective film, as component in automobile interiors and exteriors, as gymnastics mat, body protector, a trim element in automobile construction, a sound insulator, a vibration damper, a cushion, a bicycle saddle, a toy, a tire or part of a tire or a covering for a track and field surface, a covering for a sports hall or a pathway, a damping layer or a damping core in a sandwich element or a packaging.

DESCRIPTION OF RELATED ART

Moldings made of particle forms, for example EPS, EPP and ETPU, and the methods of production thereof are well known. Such moldings generally consist of one kind of particles; the moldings thereof have largely uniform properties, but there may be process-related unintentional variations in properties within a molding, for example as a result of excessive compression at constrictions.

Also known are moldings made of mixtures of foam particles, for example of gray and white EPS (called Dalmatian foams). The particles here are distributed randomly in the molding, such that the properties and appearance are mixed uniformly.

In many higher-quality applications, however, it is desirable for the moldings to have different properties (in a controlled manner) within different segments. This is generally solved in that molding segments made from different types of particles are produced separately and then bonded by adhesion, welding or form-fitting to give a molding.

It is additionally known that moldings in which segments of different properties are desired are produced using, for example, molds with slides that permit the filling of different cavities in the mold, the pulling-out of the separating slides and subsequent welding. JP355228A2 and JP03097529 describe, for example, a method with multiple cavities.

MX 2006-GT0017 describes the preshaping of expandable EPS particles in a prefoamer and the subsequent welding of the two preformed segments in a mold.

It is additionally possible to use special methods (e.g. crack methods) in which the segments can be compressed differently. But the molding density is adjustable thereby only within tight limits. Various colors, for example, cannot be established thereby.

As a result of the bonding or the use of slide molds, such moldings have sharply delimited property zones, but this is disadvantageous in many applications, for example in the case of footwear soles. Moreover, production is costly since multiple molds are required, or complicated slide molds and correspondingly complex and costly molding machines have to be used.

Moldings made from welded particle foams often also have the shortcoming that the surface of the molding does not meet technical demands or customer requirements. As a result of the manufacturing process, the surface and the structure thereof correspond to the foam particles prior to welding. If a different surface is desired than that created in the welding operation, complex methods of modification are required. For example: painting of the visible parts, coating with a reactive system or a dissolved elastomer, or introduction of the molding into a shell that has to be produced additionally.

SUMMARY OF THE INVENTION

The aim of the present invention is to introduce expanded particles having different properties in a controlled manner into a preliminary molding, to keep the preliminary molding in position or to position it directly by controlled introduction into the mold, and then to produce a molding therefrom.

This object is achieved in accordance with the invention by a process for producing a molded article (M), comprising the steps of
  (i) providing a thin-walled, gas-permeable shell;
  (ii) filling the shell with a foamed pelletized material made of a polymer (P1);
  (iii) welding the foamed pelletized material to obtain the molded article (M).

By contrast with the processes known to date which comprise multipart manufacture, welding and the use of inserts, it is possible by means of the process of the invention to dispense with process steps and to produce new combinations of materials that were unavailable to date.

DETAILED DESCRIPTION OF THE INVENTION

In the context of the present invention, a thin-walled, gas-permeable shell is used. In the context of the present invention, this shell is preferably porous. In the context of the present invention, the shell is preferably configured such that it has a shape that simulates the desired shape of the molded article (M). In the context of the present invention, the shell may be configured in such a way that it is part of the molded article (M). In an alternative embodiment, the shell may be configured such that it is removed from the molded article (M) after step (iii).

It has been found that it is possible to produce foam parts by introducing expanded foam particles into a steam-permeable shell, positioning them and welding them to the shell in the steam welding of the particles; according to the type of shell used, the shell thus enters into an inextricable bond with the particles or can be removed from the molded article after step (iii). By virtue of the properties of the shell, it is also possible in accordance with the invention to alter the properties of the molding.

The process of the invention comprises steps (i) to (iii). First of all, in step (i), a shell made of a porous material is provided. In step (ii), the shell is filled with a foamed pelletized material made of a polymer (P1). In step (iii), the foamed pelletized material is welded to obtain the molded article (M).

It is possible here in the context of the present invention that the process comprises further steps, for example shaping steps or the introduction of the shell into a suitable mold.

According to the invention, the shell may consist of a material that enters into a bond with the molded article in the welding in step (iii). However, it is also possible in the context of the present invention that the shell consists of a material that does not enter into any bond with the foamed pelletized material and is removed from the molded article after step (iii).

The shell may consist, for example, of plastic, metal, ceramic, cellulose, glass or similar materials. The shell may be, for example, a film, a weave, a knit, a nonwoven or a web.

According to the invention, the shell consists of a porous material. According to the invention, it is preferable that the steam permeability of the shell is sufficient to guarantee good welding.

In a further embodiment, the present invention accordingly also relates to a process for producing a molded article as described above, wherein the shell is a film, a weave, a knit, a mesh or a perforated metal.

It is particularly preferable that the shell is configured, for example in porous, woven, perforated or membrane-like form, such that, on welding with steam, the medium can easily approach the particles, resulting in welding within a short time.

According to the invention, it is preferable that the shell consists of a flexible porous material. In a further embodiment, the present invention accordingly also relates to a process for producing a molded article as described above, wherein the shell consists of a flexible porous material.

The shell may be executed, for example, as a hose, skin, husk, preformed hose or bonded article etc.

If the shell is welded to the foamed pelletized material in the production of the molded article, it is preferable in accordance with the invention that the shell consists of the same material as the particles of the foamed pelletized material. The process is also implementable in accordance with the invention with different materials, it being preferable that there is little difference in the melting temperatures of the materials and that the polymers are compatible with one another.

In step (ii), the shell is filled with the foamed pelletized material. According to the invention, this forms a preliminary molding. According to the invention, it is possible that the shape of the preliminary molding is defined by the shape of the shell. However, it is also possible that the shape of the preliminary molding is established by a mold prior to the welding.

In that case, the preliminary molding is introduced into the mold in step (iii) and welded. In the context of the present invention, the particles of the foamed pelletized material are welded here, and the molded article (M) is obtained. It is possible in the context of the present invention that the shell is welded to the particles of the foamed pelletized material. It is likewise possible in the context of the present invention that the shell is configured such that it is not welded to the foamed pelletized material under the conditions of step (iii), such that the shell can be removed from the molded article after step (iii).

According to the invention, it is possible that the shape of the molded article is preformed by the shape of the shell. It is likewise possible in the context of the present invention that a mold is used to define the shape of the molded article (M).

The preliminary molding can be produced in the molding machine itself or in a chamber upstream of the mold, or the preliminary molding is produced in a separate step. The chamber or vessel used in the molding machine is, for example, a steel cylinder.

According to the invention, it is possible that the shell is welded prior to the welding in step (iii). In this case, the preliminary molding is preferably closed and then transferred into the mold. This can be effected by pneumatic, hydraulic, automated or else mechanical means.

According to the invention, the welding in step (iii) can be effected by means of methods known per se to the person skilled in the art. A suitable example in the context of the present invention is welding with vapor, for example steam. In a further embodiment, the present invention accordingly also relates to a process for producing a molded article as described above, wherein the welding is effected by steam welding.

Suitable conditions and apparatuses for the steam welding are known per se to those skilled in the art. In the steam welding, the welding is effected by contact with steam. Suitable welding parameters are known per se to those skilled in the art. According to the invention, the welding parameters are matched, for example, to the size of the molded article and the polymer (P1). Suitable steam contact times are, for example, in the range from 1 to 120 seconds per steam contact step. Suitable steam temperatures are, for example, in the range from 100 to 160° C.

In a further embodiment, the present invention accordingly also relates to a process for producing a molded article as described above, wherein the shell is closed after the filling in step (ii).

In one embodiment of the present invention, the porous shell consists of the same polymer as the particle foam.

In the context of the present invention, the thickness of the shell may vary within wide ranges, provided that it is ensured that welding of the particles of the foamed pelletized material is possible. For example, the thickness of the shell is in the range from 1 to 5000 μm, further preferably in the range from 2 to 1000 μm, more preferably in the range from 5 to 500 μm, further preferably in the range from 10 to 250 μm, especially preferably in the range from 20 to 100 μm.

In an alternative embodiment of the present invention, the shell consists of a material or polymer other than the particle foams that does not bind to the polymer of the particle foams even at high temperature.

The shells of the preliminary moldings, for example after the welding, may be removed from the molded article and, depending on their design, be reused repeatedly or discarded in the case of single use. Preference is given here to reutilizable, stable shells. In a further embodiment, the present invention accordingly also relates to a process for producing a molded article as described above, wherein the shell is removed from the molded article after the welding.

According to the invention, it is also possible that the shell has a preformed shape corresponding to the shape of the desired molding. However, it is likewise possible that the shape of the molding is created by the mold, and the preliminary molding serves merely as a kind of vehicle that largely prevents mixing of the different particles. It is advantageous when the preliminary molding can fix the particles.

In a further embodiment, the present invention accordingly also relates to a process for producing a molded article as described above, wherein the shell consists of a material weldable to the foamed pelletized material.

In a further embodiment, the porous shell consists of the same polymer as the foamed pelletized material. This also ensures that the shell has good weldability to the foamed pelletized material.

Suitable polymers (P1) are known per se to those skilled in the art. In the context of the present invention, thermoplastic elastomers are especially suitable, for example thermoplastic polyurethanes, thermoplastic polyetheramides, polyetheresters, polyesteresters, thermoplastic olefin-based elastomers, crosslinked thermoplastic olefin-based elastomers or thermoplastic vulcanizates, or thermoplastic styrene-butadiene block copolymers. Suitable examples are polystyrene or derivatives thereof, polypropylene, polyethylene, ethylene-propylene-diene rubbers (EPDM), ethylene-vinyl acetate (EVA), ethylene-vinyl acetate copolymers, thermoplastic polyurethanes, polyamides, polyesters, polyvinylidene fluorides, polyetheramides, polyethylene terephthalates or polybutylene terephthalates, or mixtures and blends of the polymers mentioned. In a further embodiment, the present invention accordingly also relates to a process for producing a molded article as described above, wherein the polymer (P1) is selected from the group consisting of polystyrene, polypropylene, thermoplastic polyurethanes, polyamides, polyesters, polyvinylidene fluoride, polyetheramides, polyethylene terephthalates or polybutylene terephthalates, or mixtures and blends of the polymers mentioned.

Also known per se to the person skilled in the art are foamed pelletized materials composed of the polymers mentioned. In a further embodiment, the present invention accordingly also relates to a process for producing a molded article as described above, wherein the average diameter of the particles of the foamed pelletized material is within a range from 0.5 to 20 mm.

According to the invention, it is also possible to use two or more different foamed pelletized materials. It is firstly possible here for the foamed pelletized material to consist of different materials in each case, provided that it is ensured that the particles of the foamed pelletized materials used are weldable. It is likewise possible that the particles differ in color or size. Moldings produced in this way have, for example, zones of different properties (e.g. mechanical properties, color, particle shape, density etc.). This is achieved in that the individual particles having different properties, in accordance with the desired properties of the molding, are positioned in the preliminary molding or the mold and then bonded firmly to one another, for example by welding. In principle, it is possible in accordance with the invention to use expanded particles. However, it is also fundamentally possible to use mixtures of expanded particles and expandable particles.

In a further embodiment, the present invention accordingly also relates to a process for producing a molded article as described above, wherein at least one further foamed pelletized material is used. The polymers used as polymer (P1) are suitable in principle. In the context of the present invention, thermoplastic elastomers are especially suitable, for example thermoplastic polyurethanes, thermoplastic polyetheramides, polyetheresters, polyesteresters, thermoplastic olefin-based elastomers, crosslinked thermoplastic olefin-based elastomers or thermoplastic vulcanizates, or thermoplastic styrene-butadiene block copolymers. It is possible to use, for example, polystyrene or derivatives thereof, polypropylene, polyethylene, ethylene-propylene-diene rubbers (EPDM), ethylene-vinyl acetate (EVA), ethylene-vinyl acetate copolymers, thermoplastic polyurethanes, polyamides, polyesters, polyvinylidene fluorides, polyetheramides, polyethylene terephthalates or polybutylene terephthalates, or mixtures and blends of the polymers mentioned. Properties in which the particles used differ may, for example, be selected from the type of polymer used, for example EPS; EPP, E-TPU, E-PVDF, E-PEBA, E-PA, E-PBT E-PET; E-PES; E-PPSU, E-PSU, E-PEI; molecular weight, additives, color, density, size, shape, mechanical properties, such as modulus of elasticity, compressive strength, insulation properties, resilience, lambda value, fire properties, or electrical properties.

In a further embodiment, the present invention accordingly also relates to a process for producing a molded article as described above, wherein at least two different foamed pelletized materials of different color are used.

In a further embodiment, the present invention also relates to a process for producing a molded article as described above, wherein at least two different foamed pelletized materials having different particles are used.

It is possible here for the different particles to be introduced into the shell in a suitable manner in order to control the properties or zones of the resultant molded article. For example, the surface of the resultant molded article may also be structured. In a further embodiment, the present invention also relates to a process for producing a molded article as described above, wherein at least two different foamed pelletized materials of different color are used, which are arranged in the shell in such a way that graphic elements become visible after the welding.

Preference is given to introducing about 10-300 $g/m^2$ of shell material into the outer layer of the molding.

If colored shell material is chosen with respect to the particles, it is possible to achieve color effects that may obviate the need for painting. Transparent shell materials protect the interior of the molding from damage and contamination, but show the structure and color of the original particles.

The positioning can be achieved by production of a preliminary molding in which the particles are fixed in accordance with the desired arrangement, then the preliminary molding is introduced into the mold and the particles are welded. The particles may also be positioned directly in the mold in the desired arrangement. In other technical fields, such as in the handling of fluids or solids, for example bulk material, pebbles, slurries, or in ceramic processing and powder metallurgy, the simulation of individual particle movements is entirely customary in order to be able to predict the distribution of density in the molding.

The filling of the preliminary molding is accomplished, for example, by manual introduction or by layering, pushing, pressing, robot positioning, spinning or suction. What is important is that the particles are positioned in such a way that they then assume the desired position in the molding and maintain it during the welding process as well. This can be simulated beforehand, for example, by the abovementioned FEM simulation and designed accordingly. Suitable methods are known per se to those skilled in the art.

In a further embodiment, the present invention accordingly also relates to a process for producing a molded article as described above, wherein the shell is filled by layering, pushing, pressing, robot positioning, spinning or suction.

The preliminary molding may comprise exclusively the foam particles, but it is also possible to position other substances such as inserts, securing elements, struts, reinforcing elements, metal plates, meshes, grids, electrical or electronic components, hollow bodies, foams, pastes, adhesives, lubricants, processing auxiliaries, PU reactive systems within the preliminary molding. It is thus possible in the context of the present invention to introduce inserts made of a substance compatible with the particle foam or an incompatible substance into the preliminary molding. In this way, it is possible to further vary the properties of the finished molding. Such inserts are preferably used in components subjected to high mechanical stress, for example soles of sports footwear, in order to achieve above-described dynamic properties of the sole. As prior art, in this case, reinforcing elements or torsion bars are bonded to the sole at a later stage.

In this way, it is also easily possible to position inserts such as sensors, cables, electrical elements etc. within a welded molded article.

In a further embodiment, the present invention accordingly also relates to a process for producing a molded article as described above, wherein further elements are introduced into the shell in the filling in step (ii).

In a further embodiment, the present invention accordingly also relates to a process for producing a molded article as described above, wherein the further elements are selected from the group consisting of inserts, securing elements, struts, reinforcing elements, metal plates, meshes, grids, electrical or electronic components, hollow bodies, foams, pastes, adhesives, lubricants and processing auxiliaries.

According to the invention, it is possible to position the particles within the shell. It is advantageous when the individual particles are positioned deliberately and reproducibly. For this purpose, the particles are introduced into the mold, for example by jetting, in such a way that they come to rest exactly in the desired position. This can be effected by pneumatic nozzles, which may also be directionally movable, or the mold is designed such that, for example, a robot arm executes the positioning.

If the introducing into the mold is effected by means of flows of air or fluid, or the particles are thrown in, the properties of the particles themselves may be utilized for determination of the flight path. For example, by virtue of the weight, shape, surface characteristics thereof etc., it is also possible here to use computer simulation by way of assistance in order to calculate the flight path in advance.

The particles may also be brought into the desired position by suction through openings in the mold.

Positioning can be accomplished using aids such as adhesives etc. This is also true of the filling/production of the preliminary molding. This is called the discrete element method (DEM). Suitable simulation methods for positioning the particles are known per se to the person skilled in the art. For example, there are known methods of simulating the behavior of particles in fluids. These may be described by a combination of the abovementioned DEM method and the CFD method.

In a further aspect, the present invention also relates to a molded article obtainable or obtained by a process as described above.

The moldings of the invention may, for example, have multiple zones, for example at least two zones, of different properties. The position of the zones relative to one another and the position thereof within the molding are variable within wide ranges.

It is preferably a feature of the moldings of the invention that the transitions in properties between the zones, if desired, may also be fluid or dynamic and not just sharp, as is the case in parts of molded articles formed from individually joined parts.

The molded articles of the invention may have one or more such zones of different properties.

The moldings of the invention may also consist only partly of the above-described properties and be cohesively bonded by other molding concepts, for example adhesive bonding. It is also possible to use specialty methods such as crack molds and/or slide molds in combination.

If the shell is welded to the particles, the molded article has an additional outer layer that can have a crucial effect on the properties of the moldings.

These properties may, for example, be color, tactile properties, hydrophobicity/hydrophilicity, compressive strength, elongation at break, elasticity, resilience, shear resistance, conductivity. Depending on the thickness of the shell applied and the corresponding volume and thickness of the inner layer, these properties can be adjusted individually.

The molded articles of the invention can be used in various ways. In a further aspect, the present invention also relates to the use of a molded article obtainable or obtained by a process of the invention as footwear sole, part of a footwear sole, mattress, seat cushion, underlay, grip, protective film, as component in automobile interiors and exteriors, as gymnastics mat, body protector, a trim element in automobile construction, a sound insulator, a vibration damper, a cushion, a bicycle saddle, a toy, a tire or part of a tire or a covering for a track and field surface, a covering for a sports hall or a covering for a pathway, for example in the form of floor tiles, a damping layer or a damping core in a sandwich element or a packaging.

Further embodiments of the present invention can be found in the description and the examples. It will be appreciated that the features of the subject matter/process of the invention or of the uses recited hereinabove and elucidated hereinbelow may be used not only in the combination specified in each case but also in other combinations without departing from the scope of the invention. Thus, for example, the combination of a preferred feature with a particularly preferred feature, or of a feature not characterized further with a particularly preferred feature etc., is also encompassed implicitly even if this combination is not mentioned explicitly.

Illustrative embodiments of the present invention are detailed hereinbelow, but are not intended to limit the present invention. In particular, the present invention also encompasses those embodiments that result from the dependency references and hence combinations specified hereinbelow. More particularly, it is pointed out that, where a range of embodiments is mentioned, for example in connection with the expression "according to any of embodiments 1 to 4", the intention is that each of the embodiments within said range is explicitly disclosed. The phrase will be considered by those skilled in the art to be synonymous with the phrase "according to any of embodiments 1, 2, 3, and 4". It is explicitly stated that the following embodiments are a structured part of the description relating to general and preferred aspects of the present invention.

1. A process for producing a molded article (M), comprising the steps of
   (i) providing a thin-walled, gas-permeable shell;
   (ii) filling the shell with a foamed pelletized material made of a polymer (P1);
   (iii) welding the foamed pelletized material to obtain the molded article (M).

2. The process according to embodiment 1, wherein the welding is effected by steam welding.
3. The process according to either of embodiments 1 and 2, wherein the shell is porous.
4. The process according to any of embodiments 1 to 3, wherein the shell is a film, a weave, a knit, a mesh or a perforated metal.
5. The process according to any of embodiments 1 to 4, wherein the shell consists of a flexible porous material.
6. The process according to any of embodiments 1 to 5, wherein the shell is closed after the filling in step (ii).
7. The process according to any of embodiments 1 to 6, wherein the shell consists of a material which is weldable with the foamed pelletized material.
8. The process according to any of embodiments 1 to 6, wherein the shell is removed from the molded article after the welding.
9. The process according to any of embodiments 1 to 8, wherein the polymer (P1) is selected from the group consisting of polystyrene, polypropylene, polyethylene, ethylene-propylene-diene rubbers (EPDM), ethylene-vinyl acetate (EVA), ethylene-vinyl acetate copolymers, thermoplastic polyurethanes, polyamides, polyesters, polyvinylidene fluoride, polyetheramides, polyethylene terephthalates, polybutylene terephthalates and mixtures and blends of the polymers mentioned.
10. The process according to any of embodiments 1 to 9, wherein at least one further foamed pelletized material is used.
11. The process according to any of embodiments 1 to 10, wherein at least two different foamed pelletized materials of different color are used.
12. The process according to any of embodiments 1 to 11, wherein at least two different foamed pelletized materials having different particles are used.
13. The process according to any of embodiments 1 to 12, wherein at least two different foamed pelletized materials of different color are used, which are arranged in the shell in such a way that graphic elements become visible after the welding.
14. The process according to any of embodiments 1 to 13, wherein the shell is filled by layering, pushing, pressing, robot positioning, spinning or suction.
15. The process according to any of embodiments 1 to 14, wherein the particles are positioned in the shell in a controlled manner.
16. The process according to any of embodiments 1 to 15, wherein the controlled introduction of the particles into the shell is accomplished using a computer simulation.
17. The process according to any of embodiments 1 to 16, wherein further elements are introduced into the shell in the course of filling in step (ii).
18. The process according to embodiment 17, wherein the further elements are selected from the group consisting of inserts, securing elements, struts, reinforcing elements, metal plates, meshes, grids, electrical or electronic components, hollow bodies, foams, pastes, adhesives, lubricants and processing auxiliaries.
19. The process according to any of embodiments 1 to 18, wherein the average diameter of the particles of the foamed pelletized material is in the range from 0.5 to 20 mm.
20. A molded article obtainable or obtained by a process according to any of embodiments 1 to 19.
21. A molded article (M) obtainable or obtained by a process comprising the steps of (i) providing a thin-walled, gas-permeable shell;
(ii) filling the shell with a foamed pelletized material made of a polymer (P1);
(iii) welding the foamed pelletized material to obtain the molded article (M).

22. The molded article according to embodiment 21, wherein the welding is effected by steam welding.
23. The molded article according to either of embodiments 21 and 22, wherein the shell is porous.
24. The molded article according to any of embodiments 21 to 23, wherein the shell is a film, a weave, a knit, a mesh or a perforated metal.
25. The molded article according to any of embodiments 21 to 24, wherein the shell consists of a flexible porous material.
26. The molded article according to any of embodiments 21 to 25, wherein the shell is closed after the filling in step (ii).
27. The molded article according to any of embodiments 21 to 26, wherein the shell consists of a material which is weldable with the foamed pelletized material.
28. The molded article according to any of embodiments 21 to 26, wherein the shell is removed from the molded article after the welding.
29. The molded article according to any of embodiments 21 to 28, wherein the polymer (P1) is selected from the group consisting of polystyrene, polypropylene, polyethylene, ethylene-propylene-diene rubbers (EPDM), ethylene-vinyl acetate (EVA), ethylene-vinyl acetate copolymers, thermoplastic polyurethanes, polyamides, polyesters, polyvinylidene fluoride, polyetheramides, polyethylene terephthalates, polybutylene terephthalates and mixtures and blends of the polymers mentioned.
30. The molded article according to any of embodiments 21 to 29, wherein at least one further foamed pelletized material is used.
31. The molded article according to any of embodiments 21 to 30, wherein at least two different foamed pelletized materials of different color are used.
32. The molded article according to any of embodiments 21 to 31, wherein at least two different foamed pelletized materials having different particles are used.
33. The molded article according to any of embodiments 21 to 32, wherein at least two different foamed pelletized materials of different color are used, which are arranged in the shell in such a way that graphic elements become visible after the welding.
34. The molded article according to any of embodiments 21 to 33, wherein the shell is filled by layering, pushing, pressing, robot positioning, spinning or suction.
35. The molded article according to any of embodiments 21 to 34, wherein the particles are positioned in the shell in a controlled manner.
36. The molded article according to any of embodiments 21 to 35, wherein the controlled introduction of the particles into the shell is accomplished using a computer simulation.
37. The molded article according to any of embodiments 21 to 36, wherein further elements are introduced into the shell in the course of filling in step (ii).
38. The molded article according to embodiment 37, wherein the further elements are selected from the group consisting of inserts, securing elements, struts, reinforcing elements, metal plates, meshes, grids, electrical or electronic components, hollow bodies, foams, pastes, adhesives, lubricants and processing auxiliaries.

39. The molded article according to any of embodiments 21 to 38, wherein the average diameter of the particles of the foamed pelletized material is in the range from 0.5 to 20 mm.
40. The use of a molded article obtainable or obtained by a method according to any of embodiments 1 to 19 or of a molded article according to any of embodiments 20 to 39 as footwear sole, part of a footwear sole, mattress, seat cushion, underlay, grip, protective film, as component in automobile interiors and exteriors, as gymnastics mat, body protector, a trim element in automobile construction, a sound insulator, a vibration damper, a cushion, a bicycle saddle, a toy, a tire or part of a tire or a covering for a track and field surface, a covering for a sports hall or a pathway, a damping layer or a damping core in a sandwich element or a packaging.
41. A process for producing a footwear sole, part of a footwear sole, mattress, seat cushion, underlay, grip, protective film, component in automobile interiors and exteriors, gymnastics mat, body protector, trim element in automobile construction, sound insulator, vibration damper, cushion, bicycle saddle, toy, tire or part of a tire or covering for a track and field surface, covering for a sports hall or a pathway, damping layer or a damping core in a sandwich element or a packaging, wherein a molded article obtainable or obtained by a process according to any of embodiments 1 to 19 or a molded article according to any of embodiments 20 to 39 is used.

The examples that follow serve to illustrate the invention but are in no way limiting with regard to the subject matter of the present invention.

EXAMPLES

1. Example 1

Particles of E-TPU 1180 G2 of different color (white and red) are introduced in layers into a hose of TPU nonwoven 25 g/m$^2$. The hose is sealed under slight pre-tension. The hose is introduced loosely into a perforated, steam-permeable mold. The mold is inserted into a sheet mold and welded in an Erlenbach molding machine with steam as follows:
 Steam temperature: 105° C.
 Cross-steam 1: 2 s 0.5 bar
 Cross-steam 2: 2 s 0.5 bar
 Autoclave, moving side: 2 s 1.6 bar
 Autoclave, fixed side: 2 s 1.6 bar
 Result: Molding loosely welded, density about 150 g/l, no movement of the particles apparent, TPU nonwoven barely still apparent (melted), particle structure not very pronounced.

2. Example 2

Particles of E-TPU 1180 G2 are introduced in a layered manner into a hose made of TPU 1195D nonwoven 150 g/m$^2$. The hose is sealed under slight pre-tension. The hose is introduced loosely into a perforated, steam-permeable mold. The mold is inserted into a sheet mold and welded in an Erlenbach molding machine with steam as follows:
 Steam temperature: 110° C.
 Cross-steam 1: 2 s 0.8 bar
 Cross-steam 2: 2 s 0.8 bar
 Autoclave, moving side: 2 s 1.6 bar
 Autoclave, fixed side: 2 s 1.6 bar
 Result: Molding loosely welded, density about 150 g/l, no movement of the particles apparent, TPU nonwoven still apparent. Particle structure not very pronounced. Tensile strength of the molding is 20% higher than a molding without the shell.

3. Example 3

Expanded particles of Ecoflex (biodegradable polyester from BASF SE) are introduced into a hose of Ecoflex Nonwoven 30 g/m$^2$. The hose is sealed under slight pre-tension. The hose is introduced loosely into a perforated, steam-permeable mold. The mold is inserted into a sheet mold and welded in an Erlenbach molding machine with steam as follows:
 Steam temperature: 105° C.
 Cross-steam 1: 2 s 0.5 bar
 Cross-steam 2: 2 s 0.5 bar
 Autoclave, moving side: 2 s 1.6 bar
 Autoclave, fixed side: 2 s 1.6 bar
 Result: Molding loosely welded, density about 150 g/l, no movement of the particles apparent, nonwoven barely still apparent (melted), particle structure not very pronounced.

4. Example 4

Particles of E-TPU 1180 G2 are introduced in a layered manner into a hose made of red TPU nonwoven 25 g/m$^2$. The hose is sealed under slight pre-tension. The hose is introduced loosely into a perforated, steam-permeable mold. The mold is inserted into a sheet mold and welded in an Erlenbach molding machine with steam as follows:
 Steam temperature: 105° C.
 Cross-steam 1: 2 s 0.5 bar
 Cross-steam 2: 2 s 0.5 bar
 Autoclave, moving side: 2 s 1.6 bar
 Autoclave, fixed side: 2 s 1.6 bar
 Result: Molding loosely welded, density about 150 g/l, TPU nonwoven structure barely still apparent (melted), the molding is red on the outside.

5. Example 5

Particles of E-TPU Infinergy of different color (white and red) are introduced manually in two layers into a hose (diameter 40 mm, length 150 mm, made of 15 den nylon weave). The hose is sealed under slight pre-tension. Subsequently, the hose is introduced into a steam-permeable metal mold of dimensions 200×200×60 mm. The mold is positioned in a round disk-shaped tool of diameter 300 mm, thickness 90 mm, and welded in an Erlenbach EHV-C 520/420 molding machine.
 Steam temperature: 105° C.
 Cross-steam 1: 2 s 0.5 bar
 Cross-steam 2: 2 s 0.5 bar
 Autoclave, moving side: 2 s 1.6 bar
 Autoclave, fixed side: 2 s 1.6 bar
 Result: The molding was loosely welded with a density of 150 g/l, no shift in the particles is apparent, the nylon hose can be detached easily from the molding after the welding operation.

6. Example 6

Particles of E-TPU Infinergy of different color (white and red) are introduced manually in layers into multiple hoses made of 15 den nylon weave. The hoses are sealed under slight pre-tension and then introduced into a steam-permeable metal mold of dimensions 200×200×60 mm. The mold is positioned in a round disk-shaped tool of diameter 300 mm, thickness 90 mm, and welded in an Erlenbach EHV-C 520/420 molding machine.

Steam temperature: 105° C.
Cross-steam 1: 2 s 0.5 bar
Cross-steam 2: 2 s 0.5 bar
Autoclave, moving side: 2 s 1.6 bar
Autoclave, fixed side: 2 s 1.6 bar
Result: The moldings were loosely welded with a density of 150 g/l, no movement of the hoses or particles relative to one another is apparent, the nylon hoses can be separated from one another, and the moldings can be removed easily from the hoses.

7. Example 7

Particles of E-TPU Infinergy of different color (white and red) are introduced manually in two layers into a hose (diameter 40 mm, length 150 mm, made of 15 den nylon weave). The hose is sealed under slight pre-tension. Subsequently, the hose is introduced into a steam-permeable metal mold of dimensions 200×200×60 mm. The mold is positioned in a round disk-shaped tool of diameter 300 mm, thickness 90 mm, and welded in an Erlenbach EHV-C 520/420 molding machine.

Steam temperature: 115° C.
Cross-steam 1: 2 s 0.5 bar
Cross-steam 2: 2 s 0.5 bar
Autoclave, moving side: 2 s 1.6 bar
Autoclave, fixed side: 2 s 1.6 bar
Result: The molding was loosely welded with a density of 300 g/I without voids under compression, no shift in the particles is apparent, the nylon hose can be detached easily from the molding after the welding operation.

8. Example 8

Particles of Infinergy E-TPU 1180 G2 of different color (white and red) are inserted into a perforated, steam-permeable metal mold of dimensions 200×200×60 mm. The particles are positioned such that there is a sharp vertical separation of the red and white particle layers in 2 segments in the mold.

The mold is positioned in a round disk-shaped tool of diameter 300 mm, thickness 90 mm, and welded in an Erlenbach EHV-C 520/420 molding machine.

Steam temperature: 105° C.
Cross-steam 1: 2 s 0.5 bar
Cross-steam 2: 2 s 0.5 bar
Autoclave, moving side: 2 s 1.6 bar
Autoclave, fixed side: 2 s 1.6 bar
Result: The molding was loosely welded with a density of 150 g/l, no shift in the particles is apparent, the molding can be easily removed from the metal mold after the welding operation.

9. Example 9 (Comparative Example)

Particles of Infinergy E-TPU 1180 G2 are inserted into a steam-impermeable polyethylene film of size 200×200×60 mm. The inlet at which the particles are introduced is welded in order to make the entire film steam-impermeable. The particles inserted are inserted into a square mold of size 200 mm*20 mm and contacted with steam in order to weld them.

The welding was effected in a molding machine from Kurtz ersa GmbH (Energy Foamer K68).

Steam temperature: 150° C.
Cross-steam 1: 40 s 1.3 bar
Cross-steam 2: 20 s 1.1 bar
Autoclave, moving side: 10 s 0.8 bar
Autoclave, fixed side: 10 s 1.3 bar
Result: By comparison with examples 1 to 8, an elevated energy supply was used here (longer steam times and higher vapor pressures to some degree), which additionally promote welding. Nevertheless, the particles do not become welded in the steam-impermeable polyethylene film, but still remain loose in the film.

LITERATURE CITED

JP355228A2
JP03097529
MX 2006-GT0017

The invention claimed is:

1. A process for producing a molded article (M), comprising: (i) filling a thin-walled, gas permeable shell with a foamed pelletized material made of a polymer (P1); and (ii) welding the foamed pelletized material to obtain the molded article (M); wherein the shell is configured such that it has a shape that simulates the shape of the molded article (M) and wherein the shell conforms to the shape of a mold.

2. The process according to claim 1, wherein the welding is steam welding.

3. The process according to claim 1, wherein the shell is porous.

4. The process according to claim 1, wherein the shell is a film, a weave, a knit, a mesh or a perforated metal.

5. The process according to claim 1, wherein the shell consists of a flexible porous material.

6. The process according to claim 1, wherein the shell is closed after the filling in (i).

7. The process according to claim 1, wherein the shell consists of a material which is weldable with the foamed pelletized material.

8. The process according to claim 1, wherein the shell is removed from the molded article (M) after the welding.

9. The process according to claim 1, wherein the polymer (P1) is selected from the group consisting of polystyrene, polypropylene, polyethylene, ethylene-propylene-diene rubbers (EPDM), ethylene-vinyl acetate (EVA), ethylene-vinyl acetate copolymers, thermoplastic polyurethanes, polyamides, polyesters, polyvinylidene fluoride, polyetheramides, polyethylene terephthalates, polybutylene terephthalates, and mixtures and blends thereof.

10. The process according to claim 1, wherein in (i), the shell is filled with the foamed pelletized material and at least one further foamed pelletized material.

11. The process according to claim 1, wherein in (i), shell is filled with the foamed pelletized material and at least one further foamed pelletized material of a different color or at least one further foamed pelletized material having different particles.

12. The process according to claim 1, wherein in (i), the shell is filled with the foamed pelletized material and at least one further foamed pelletized material of a different color, wherein the foamed pelletized material and the at least one further foamed pelletized material are arranged in the shell in such a way that graphic elements become visible after the welding.

13. The process according to claim 1, wherein the shell is filled by layering, pushing, pressing, robot positioning, spinning or suction.

14. The process according to claim 1, wherein particles of the foamed pelletized material are positioned in the shell in a controlled manner.

15. The process according to claim 1, wherein a controlled introduction of particles of the foamed pelletized material into the shell is accomplished using a computer simulation.

16. The process according to claim 1, wherein at least one further element is introduced into the shell in the course of filling in (i).

17. The process according to claim 16, wherein the at least one further element is selected from the group consisting of inserts, securing elements, struts, reinforcing elements, metal plates, meshes, grids, electrical or electronic components, hollow bodies, foams, pastes, adhesives, lubricants, and processing auxiliaries.

18. The process according to claim 1, wherein an average diameter of particles of the foamed pelletized material is in the range from 0.5 to 20 mm.

19. A molded article obtained by the process according to claim 1.

20. The molded article according to claim 19, wherein the molded article is a footwear sole, a part of a footwear sole, a mattress, a seat cushion, an underlay, a grip, a protective film, a component in automobile interiors and exteriors, a gymnastics mat, a body protector, a trim element in automobile construction, a sound insulator, a vibration damper, a cushion, a bicycle saddle, a toy, a tire or part of a tire, a covering for a track and field surface, a covering for a sports hall or a pathway, a damping layer or a damping core in a sandwich element, or a packaging.

* * * * *